(12) United States Patent
Baudino et al.

(10) Patent No.: US 8,706,139 B2
(45) Date of Patent: Apr. 22, 2014

(54) APPARATUS, AND ASSOCIATED METHOD, FOR ESTIMATING A TIME ZONE AT WHICH A DEVICE IS POSITIONED

(75) Inventors: Daniel Alberto Baudino, Lake Worth, FL (US); Steven Alfonse Zaccardi, Coral Springs, FL (US); Jigar Shah, Coral Springs, FL (US); Dominik Buszko, Weston, FL (US); Tiranuch Anantvalee, Coral Springs, FL (US)

(73) Assignee: BlackBerry Limited (CA)

( * ) Notice: Subject to any disclaimer, the term of this patent is extended or adjusted under 35 U.S.C. 154(b) by 15 days.

(21) Appl. No.: 13/350,904

(22) Filed: Jan. 16, 2012

(65) Prior Publication Data

US 2012/0225664 A1 Sep. 6, 2012

Related U.S. Application Data

(60) Provisional application No. 61/444,988, filed on Feb. 21, 2011.

(51) Int. Cl.
*H04W 24/00* (2009.01)
(52) U.S. Cl.
USPC .................... 455/456.1; 455/418; 455/414.1; 368/21

(58) Field of Classification Search
USPC ............ 455/456.1–456.6, 418, 414.1–414.4; 368/21
See application file for complete search history.

(56) References Cited

U.S. PATENT DOCUMENTS

| 7,948,832 | B1* | 5/2011 | Luo et al. ........................ 368/21 |
| 2002/0181333 | A1 | 12/2002 | Ito et al. | |
| 2004/0228428 | A1* | 11/2004 | Cho ................................ 375/354 |
| 2008/0013540 | A1* | 1/2008 | Gast .............................. 370/392 |
| 2009/0219205 | A1 | 9/2009 | Jazra et al. | |
| 2011/0176494 | A1* | 7/2011 | Huang et al. .................. 370/329 |

FOREIGN PATENT DOCUMENTS

EP 1873670 A1 1/2008

* cited by examiner

*Primary Examiner* — Vladimir Magloire
(74) *Attorney, Agent, or Firm* — Wolff & Samson, PC

(57) ABSTRACT

An apparatus, and an associated method, estimates a time zone at which an electronic device, such as a wireless device, is positioned. Parameters, such as a mobile country code, a GMT offset, a daylight savings time parameter, and geo location parameters are all candidate parameters from which to make an estimate. Received parameters are identified, and selectably used to obtain an estimate that is matched or verified to ensure likely accuracy.

16 Claims, 3 Drawing Sheets

APPARATUS, AND ASSOCIATED METHOD, FOR ESTIMATING A TIME ZONE AT WHICH A DEVICE IS POSITIONED

CROSS-REFERENCE OF RELATED APPLICATION

The present application claims the benefit of U.S. Provisional Application Ser. No. 61/444,988 filed on Feb. 21, 2011, the contents of which are incorporated herein by reference.

The present disclosure relates generally to a manner by which to estimate the time zone at which a wireless, or other electronic, device is positioned. More particularly, the present disclosure relates to an apparatus, and an associated method, by which to estimate the time zone using one or more parameters delivered to the wireless device.

Selection of which parameter, or parameters, to use is made to obtain an estimate that is likely to be valid while limiting the amount of resources that are consumed in the estimation.

BACKGROUND

Advancements in communication technologies have permitted the development and deployment of new types of communication systems and new types of communication devices operable in such systems. The availability of such systems through which to communicate has, for many, become a practical necessity of everyday life.

Cellular communication systems, and other radio communication systems, are exemplary of communication systems that are used by many. The network infrastructures of cellular communication systems have been installed to encompass significant portions of the populated areas of the world. A wireless device, sometimes referred to as a mobile device or mobile station, is used to communicate by way of the network infrastructure. When a wireless device is positioned within the coverage area of the network infrastructure and granted access to communicate by way of the network infrastructure, a user is able to carry out a communication service with a remote location by way of the network infrastructure. Communications are effectuated using a wireless device positioned at almost any location encompassed by the network infrastructure of the communication system.

Other wireless communication systems, such as WLANs (Wireless Local Area Networks), exhibit various of the communication attributes of cellular communication systems. Use of WLANs, as well as other radio communication systems, is also frequently made to carry out communication services.

Successive generations of cellular, and other, communication systems have been developed and deployed. First-generation systems that were first deployed provided for voice communication services and limited data communication services. Successor-generation systems generally provide for more data-intensive communication services as well as the services provided by prior-deployed communication systems. New-generation systems, for instance, provide for the communication of large amounts of data to permit data-intensive communication services to be performed.

Wireless devices operable in a cellular communication system are typically of small dimensions and weights. The devices are typically of sizes and weights to permit the devices easily to be hand-carried by a user. And, such devices are regularly hand-carried by the user, or otherwise maintained at, or close to, the user so that the wireless device is available, when needed, to carry out a communication service. The network infrastructures are operated by network operators. And, network operators sometimes operate networks that are national, or sometimes international, in scope.

Due to the portability of wireless devices that permit the wireless devices easily to be carried by a user, a wireless device exhibits the same mobility as the user that carries the device. If, for instance, the user travels, the wireless device, carried by the user, travels along with the user. The travel might be limited, such as the travel of the user during a daily commute between typical home and work locations. But, if the user travels longer distances, for instance, travels by air or otherwise travels a significant distance, the wireless device, carried with the user, correspondingly travels a significant distance.

The repositioning of the wireless device at the new location might require registration of the wireless device at a different network, such as a network with which the operator of a home network associated with the wireless has a roaming agreement. The registration, if needed, of the wireless device at the new network permits connection of the wireless device in communication connectivity with the network so that a communication service can be carried out by, or with, the wireless device.

Pursuant to registration, and as well as at other times during operability of the wireless device, operating parameters are provided to the wireless device, either automatically or responsive to query by the wireless device. The operational parameters are used pursuant to operation of the wireless device to permit communication connectivity as well as to define and to control aspects of operation of the wireless device.

When the wireless device is repositioned at the new location, sometimes, not only is the geographical positioning changed, but, further, the local time in the area at which the wireless device is positioned is also be changed relative to the local time at which the wireless device was previously positioned. Changes in local time, such as the result of changing into, or out of, daylight savings time, or other local time change, might cause the local time to change.

While various of the operation parameters provided to the wireless device provide for an inference to be drawn of the local time and time zone, time zone in which the wireless device is positioned. Additionally, the parameters that are provided to the wireless device might not be current or available, and if available, the parameter, might not be accurate or might even be incorrect.

A solution to these, and other, problems of the existing art are therefore needed.

It is in light of this background information that the significant improvements of the present disclosure have evolved.

DETAILED DESCRIPTION

Figure 1:
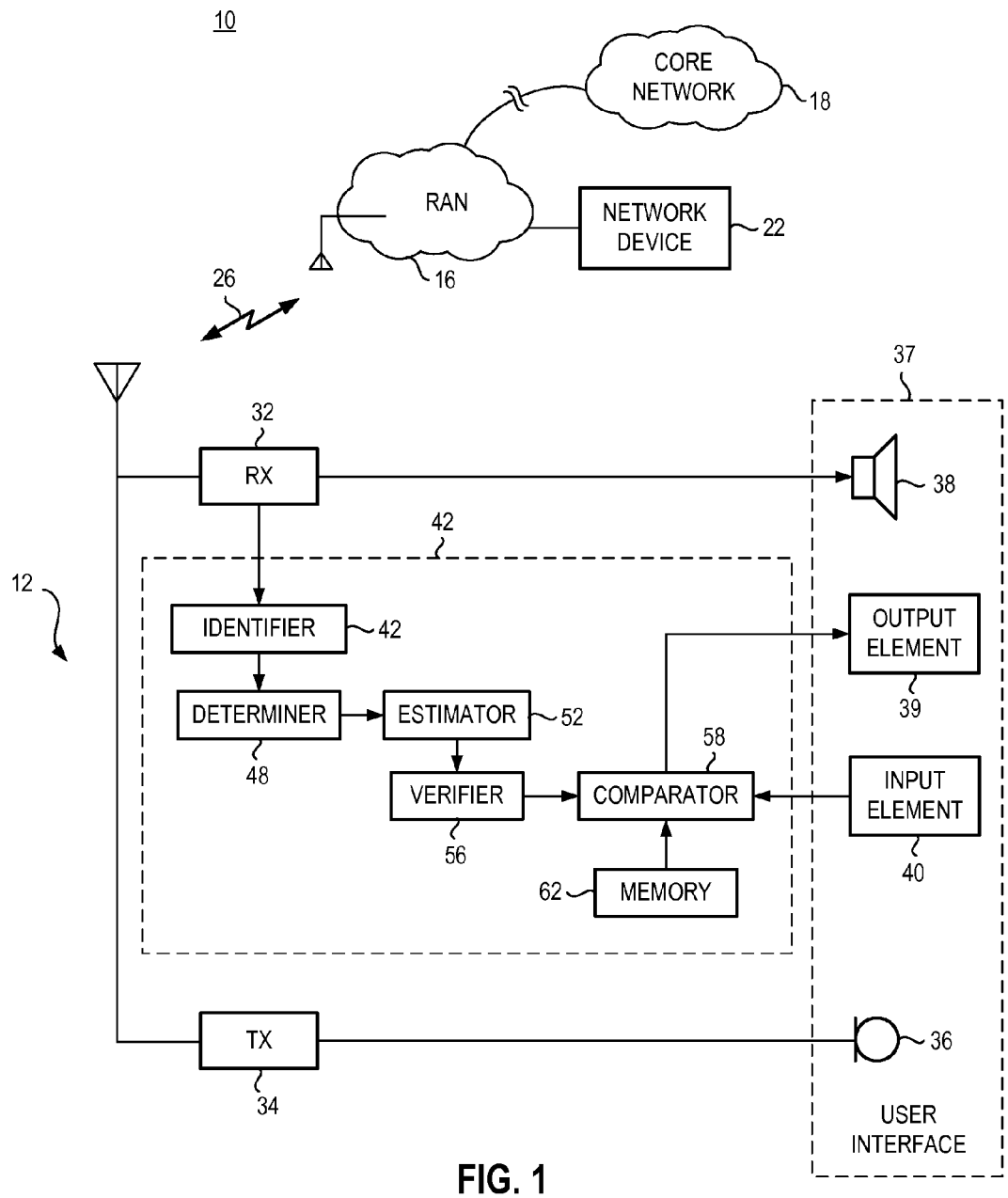
FIG. 1 illustrates a functional block diagram of a communication system in which an implementation of the present disclosure is operable.

The present disclosure, accordingly, advantageously provides an apparatus, and an associated method, for facilitating estimation of a time zone at which a wireless, or other electronic, device is positioned.

Through operation of an implementation of the present disclosure, a manner is provided by which to select one or more parameters delivered to the wireless, or other electronic, device from which to estimate the time zone at which the device is positioned, to perform the estimation, and to verify the likely accuracy of the estimation. The parameters thereby are used to estimate t he time zone.

In one aspect of the present disclosure, selection is made of one or more delivered, parameters to minimize resource consumption, such as battery consumption, data transfer bandwidth, and processing time, or other time period, needed to make the estimation while also providing for an accurate time-zone estimation.

In another aspect of the present disclosure, an identifier is provided to make identification of parameters delivered to, and detected at, the wireless, other electronic, device. Each parameter is downloaded, or otherwise communicated, to the device. A parameter is provided to the device either automatically or responsive to the request for the parameter. A parameter is provided to a wireless device, for instance, pursuant to registration of the device, such as when initially-powered, at selected intervals, or triggered responsive to an event occurrence.

In another aspect of the present disclosure, a determiner is provided to determine which, if any, parameters have been received at the device. The determiner determines, for instance, if more than one parameter has been received. And, specifically, the determiner determines whether to select two parameters, such as a mobile country code (MCC) and a GMT (Greenwich Mean Time (GMTM) offset. The mobile country code is a network-provided parameter that identifies at least the country, by a coded indication, at which the network is located. And, the GMT offset is also a network-provided parameter. The GMT offset is a parameter that indicates a time difference in, e.g., hours, that the local time is offset from the Greenwich Mean Time. The GMT offset is, e.g., part of a NITZ (Network Indicated Time Zone) Indication. Communication of the mobile country code and of the GMT offset is network-specific. That is to say, the generation of such parameters is dependent upon the network-type, i.e., the operating protocols and standards with which the network conforms. The MCC is defined and is mandatorily broadcast in the protocols of certain communication systems but not others. And, the GMT offset is part of a mandatory broadcast in certain communication systems but not others.

In another aspect of the present disclosure, an estimator is provided to estimate the time zone of the location at which the wireless, or other electronic, device is positioned. When a determination is made that more than one parameter has been received, the estimator, if desired, makes an estimation of the time zone of the location at which the wireless device is positioned based upon a combination of the more than one parameter. If, for instance, both a MCC and a GMT offset are identified to have been delivered to the device, the estimation is based upon a combination of the received parameters. A determination is made when making the estimate based upon the more than one parameter as to whether the parameters match, i.e., correspond or otherwise are non conflicting. If the parameters match, correspond, or do not conflict, then the estimation is considered likely to be accurate, that is to say, the estimate is considered to be strong.

In another aspect of the present disclosure, a verifier verifies the estimated value. The verification is made, for instance, by comparing the estimation with a current-time indication, such as an indication provided by a time server, if available.

In another aspect of the present disclosure, if only a single parameter is available, or if the estimation based upon the more than one parameter does not match or cannot be verified, then the estimation is made upon a single parameter. The single parameter is, e.g., either of the aforementioned MCC or GMT offset parameters, if available, and the estimation is verified, such as verified with a current time provided by, e.g., a time server. The use, or availability, of the MCC and GMT offset parameters and relative priorities and weights given to the parameters in the time-zone estimation. If the verification is positive, then the estimation is considered likely to be accurate. If the verification is negative, then estimation is performed in another manner. And, for example, if the time-zone-estimate is able to be made using the MCC, the GMT offset, or a DST, Daylight Savings Time, parameter, then the estimates so-obtained is utilized as the estimate. If the estimate is unable to be obtained, then geographic location information is utilized to obtain the estimate. The geographic location information comprises, for instance, a cell identity, cell ID, of a base transceiver station, or other sending station within range of the device. Or, the geographic location information comprises GPS, Global Positioning System, information.

In another aspect of the present disclosure, once an estimate is obtained, the estimated time zone is compared to an existing time-zone time. If the values are dissimilar, then the new time zone is set, or a user of the device is prompted to set the new time zone. And, if there is no change in the time zone, then the time zone is set without need for user interaction.

In these and further aspects, therefore, an apparatus, and an associated method, is provided for facilitating estimation of a time zone at which an electronic device is positioned. A determiner is configured to determine if more than one time-zone-estimative parameter has been received at the electronic device. An estimator is configured to obtain an estimate of the time zone based upon at least two time-zone-estimative parameters if determination is made that at least two selected time-zone-estimative parameters have been received at the electronic device. The estimator is configured to obtain an estimate of the time zone based upon one time-zone-estimative parameter if a single selected time-zone-estimative parameter has been received at the electronic device.

Turning first, therefore, to FIG. 1, a communication system 10 provides for communications with wireless devices of which the wireless device 12 is exemplary. The communication system 10, in the exemplary implementation, comprises a cellular communication system that operates in general conformity with an operating specification of a cellular communication standard. The communication system is also representative of any of various other communication systems having wireless devices that are provided mobility, i.e., are positionable at different times at different locations. And, more generally, the wireless device 12 is representative of any of various electronic devices that are positionable, at different times, at different locations.

The communication system includes a network part, here represented by a radio access network (RAN) 16 and a core network (CN) 18, such as a data network, e.g., the Internet. Devices are placeable in communication connectivity with the network 16 or 18. Here, a network device 22 associated with the network operator of the network 16 is shown. Various informational parameters are sourced at, or routed by way of the network device 22. The network device 22 is representative of any of various network devices, specifically including network devices that generate parameters. While the following description shall describe exemplary operation in which the parameters are sourced at the network device 22, in an actual implementation, the parameters are sourced at any of various network locations and entities.

Communication connectivity with the wireless device is provided by way of radio channels defined upon a radio air interface formed to extend between the network and the wireless device. Radio channels 26 are represented by the arrow extending between the radio access network 16 and the wireless device 12.

The wireless device includes radio transceiver circuitry, here represented by a receive (Rx) part 32 and a transmit (Tx) part 34. Information sourced at the wireless device, such as speech information transduced by a transducer 36 into electrical form, is caused to be transmitted by the transmit device 34 and by way of radio channels and the networks 16 and 18 for delivery to a destination. And, information sourced elsewhere, including at the network device 22, is routed through the network 16 and/or 18 and sent by way of radio channels 26 for delivery to the wireless device. The transducer 36 forms part of a user interface 37, which also includes a speaker 38, an output element 39, and an input element 40.

As mentioned previously, during operation of the communication signal, parameters are communicated to the wireless device 10. The parameters that are communicated during operation of the system 10 are network-dependent. That is to say, certain parameters are sent during operation of some networks and not others and vice versa. Additionally, such parameters to be useful to the device must also be timely, up-to-date and accurate. And, as mentioned previously, not only are not all of the parameters available at any particular time, but, additionally, if available, the parameters might not be accurate or might be incorrect, limiting the accuracy of conventional time-zone estimation.

An implementation of the present disclosure takes advantage of the parameters that are provided to the device 12, either by the network or other circuitry, to obtain an estimate of the time zone, that is to say, the parameters are time-zone estimative. Selection of which parameters to use in the estimation or the priority is dependent upon which are received and the wireless technology, considered likely to be accurate, and consume the least resources.

The wireless device includes an apparatus 42 of an implementation of the present disclosure. The apparatus 42 facilitates estimation of a time zone at a location at which the device 12 is positioned. The apparatus 42 is functionally implementable in any desired manner including, for instance, hardware implementations, firmware implementations, algorithms executable by processing circuitry, and combinations thereof. In the exemplary implementation, the elements of the apparatus 42 are physically located at the wireless device. In other implementations, the elements are distributed at more than one physical location.

The apparatus 42 includes an identifier 46, a determiner 48, an estimator 52, a verifier 56, a comparator 58, and a memory element 62. The functions performed by the elements of the apparatus are, in one implementation, carried out at a control element of the device 12.

The identifier 46 is coupled to receive indication of parameters communicated to, and received at, the receive part 32 of the device 12. In the exemplary implementation, the identifier identifies delivery at the device 12 of each of the parameters at the device. An indication of the identification, and which here also includes the identity of each of the parameters, is provided to the determiner 48.

The determiner 48 determines if more than one selected parameter, indicated by the identifier, has been received at the electronic device. In the exemplary implementation, the determiner determines if both an MCC, mobile country code, and a GMT, Greenwich Mean Time, offset have been received at the wireless device. Determination is also made if other parameters are received and identified or if only a single parameter is received and identified.

Determination made by the determiner is provided to the estimator 52. The estimator operates to obtain an estimate of the time zone based upon one or more parameters received at the device 12. The estimator first makes estimation of the time zone based upon the at least two selected parameters if the selected parameters are received at the device.

A mobile country code is a network-provided parameter that is broadcast in GSM-based (General System for Mobile Communications-based) networks. An MCC is not mandated to be broadcast in a CDMA-based (Code-Division, Multiple-Access-based) network. The mobile country code identifies the country in which the network station that broadcasts the mobile country code. The mobile country code does not necessarily permit direct estimation of the time zone therefrom. If the mobile country code is of a country having multiple time zones, the mobile country code permits a precision of estimation corresponding to the number of time zones with which the identified country encompasses. Therefore, for the reason that the MCC is network-specific and might be indicative of more than one time zone, an estimation based solely upon a mobile country code is generally a speculative estimation.

A GMT offset is a parameter that identifies a time difference, typically in hours or a gradient thereof, offset from Greenwich Mean Time. The GMT offset parameter is typically broadcast by a network that provides an NITZ (Network Identity and Time Zone). The NITZ is not generally a mandated communication, and, therefore, the GMT offset parameter is not always available. Additionally, the GMT offset is not necessarily broadcast correctly. In a CDMA network an NITZ is generally required, and the GMT offset is, therefore, typically sent to a wireless device operable in such a network. The relative importance of potential validity of a GMT offset in a CDMA network is therefore generally higher than that in a GSM network. Additionally, even if broadcast correctly, a GMT offset does not permit direct estimation of a time zone, due, e.g., to different time zone definitions and daylight savings time changes at a local area. Therefore, use, alone, of a GMT offset to estimate a time does not permit, generally, an estimation with high likelihood of accuracy.

Estimation made by the estimator using both the MCC and GMT offset parameters is permitting of generation of an estimate that has a strong likelihood of accuracy. When the estimation is based upon more than one parameter, a determination is further made of a match between the parameters which, in the exemplary implementation, further includes a DST (Daylight Savings Time) parameter that, e.g., is sometimes sent as part of the NITZ. If a match is confirmed, the estimate based upon the multiple parameters is considered to be strong, i.e., likely to be correct. The estimate formed by the estimator based upon the multiple parameters, when available, is verified by the verifier 56. The verifier verifies the estimate obtained by the estimator such as, e.g., by comparing the estimate with a current time provided by a time server. If a current time, or the time server is unavailable, verification is not performed.

The estimator further forms an estimation based upon a single parameter if multiple, selected parameters are not available or if an estimation based upon the multiple parameters is not matched or is not verified. And, instead, estimation is based upon a single parameter. Estimation is based upon a received MCC parameter. The estimation is considered to be weak when the originating network is a GSM network and is considered to be very weak when the originating network comprises a CDMA network. And, estimation using a GMT offset parameter, using a GSM-network-originated parameter is considered to be very weak, while a GMT offset originated at a CDMA network is considered to be weak.

Estimation by the estimator based upon a single parameter is verified by the verifier when a current time, such as a current time sourced by a time server is available. If verification is made, i.e., verification is positive, the estimation based upon the single parameter is considered to be strong.

In one implementation, if the verification is negative, then the estimation is made in another manner. For instance, the estimation is made by comparing current time information with time values stored at the wireless device.

If an estimation that appears likely to be valid, i.e., that is considered to be strong, then the estimated time zone is set at the device 12 as the time zone of the area at which the wireless device is positioned. If the estimation is considered to be weak, the estimation is made in an alternative manner. If the MCC, GMT offset and DST parameters are unavailable, or if the estimation based upon, or derived from, the parameter is considered to be weak, the estimation is based upon a geographic location parameter, i.e., a Geo Location. The geographic location parameter comprises, for instance, a Cell ID or GPS information.

Geo location information, when obtained from a Cell ID, is converted to latitude and longitude coordinates and then converted to a readable, meaningful value, such as country, state, etc. using reverse geo coding. A Geo location parameter is very accurate, but the parameter is not always available, due, e.g., data not being available for a specific cell or when data access is not available. Obtaining of Geo location information based upon the parameter also is power-consumptive and also time- and data-transfer-consumptive. Positioning information is also obtainable from a GPS, Global Positioning System, information parameter. The GPS information is generally very accurate, represented in latitudinal and longitudinal coordinates. GPS information also has to be converted, using reverse geo coding operations into a meaningful form, such as country, state, etc. representations. An estimation based upon a GPS parameter is also power-, time-, and data-transfer-consumptive.

When an estimation is made based upon any, or any combination, of the parameters, a new time zone time is compared with an existing time zone time by the comparator 48. The existing time zone is, for instance, stored at the memory 68 and retrieved for performing the comparison. If the values differ, a user of the wireless device is prompted to make selection, e.g., by way of the input element 40 or the time zone is automatically set and, e.g., displayed at the output element 39. If the comparison indicates there to be no change in the time, then the time zone is set without user intervention.

Figure 2:
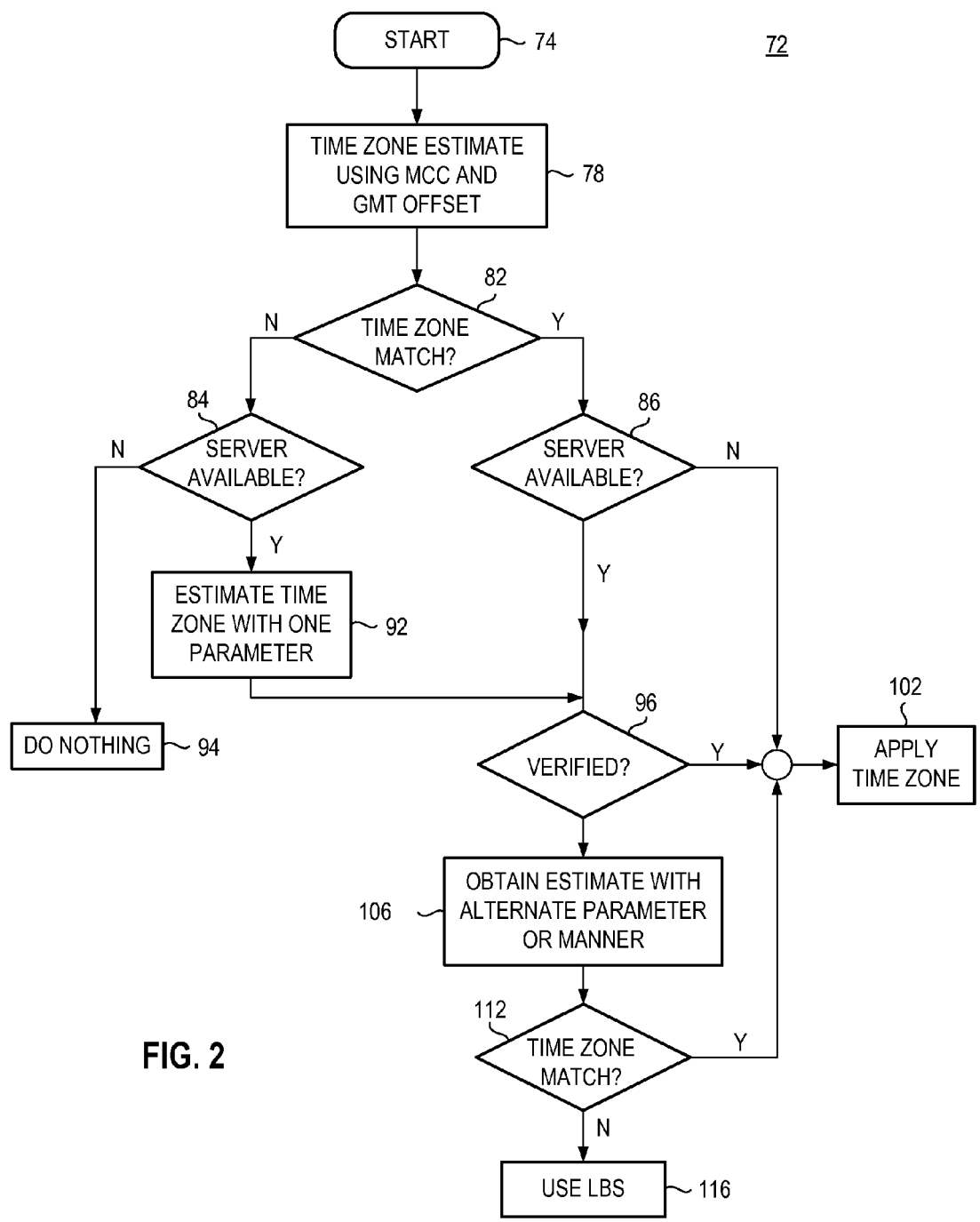
FIG. 2 illustrates a process diagram representative of the process of operation of an implementation of the present disclosure.

FIG. 2 illustrates a process diagram 72 representative of the process of operation of an implementation of the present disclosure. The process estimates a time zone of the area at which a wireless, or other electronic, device is positioned. After entry, indicated by the start block 74, a time zone estimation using an MCC and a GMT offset is made, indicated by the block 78, if the parameters are available. A determination is made at the decision block 82, as to whether a time zone match is successful. If not, the no branch is taken to the decision block 84. And, if so, the yes branch is taken to the decision block 86. At the decision blocks 84 and 86, determinations are made as to whether a time server from which to obtain a current time indication, is available.

If a determination is made at the decision block 84 that a time server is available, the yes branch is taken to the block 92. At the block 92, the estimated time zone is selected. If a server is not available, the no branch is taken from the decision block to the block 94 and additional action is not taken.

If at the decision block 86, if a time server is available, the yes branch is taken to the decision block 96. A path is also taken from the block 92 to the decision block 96. At the decision block 96, a determination is made as to whether the estimated time zone is verified using the current time obtained by a time server. If so, the yes branch is taken to the block 102, and the estimated time zone is applied.

If the verification fails, the no branch is taken to the block 106. At the block 106, a second estimation, using an alternate parameter is made. Then, and as indicated by the decision block 112, a determination is made as to whether the estimated time zone is matched. If so, the yes branch is taken to the block 102. If not, the no branch is taken to the block 114, and a LBS, location based selection, is used. The location based selection utilizes a cell ID or GPS parameter.

Figure 3:
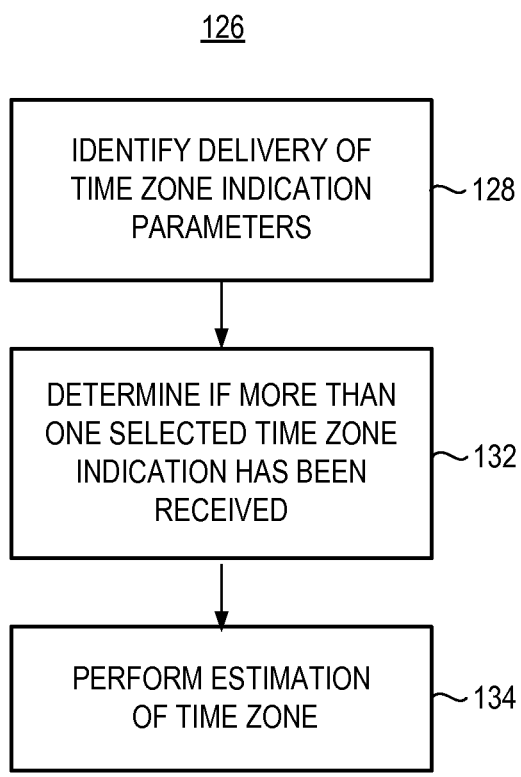
FIG. 3 illustrates a method flow diagram representative of the method of operation of an implementation of the present disclosure.

FIG. 3 illustrates a method flow diagram 126 representative of the method of operation of an implementation of the present disclosure. The method facilitates estimation of a time zone at which an electronic device is positioned. First, and as indicated by the block 128, delivery at the electronic device of up to a selected plurality of time-zone-estimative parameters is identified. Then, and as indicated by the block 132, a determination is made as to whether more than one time-zone-estimative parameter has been received at the electronic device.

Thereafter, and as indicated by the block 134, an estimate of the time zone is obtained. The estimate is based upon at least two parameters if determination is made that at least two selected parameters have been received at the electronic device. The estimate is obtained based upon one parameter if a single selected parameter has been received.

Thereby, a manner is provided by which to estimate the time zone at which an electronic device is positioned. The estimation is based upon one or more parameters received at the device. The estimation utilizes redundancy, if possible, while also minimizing the number of parameters used and minimizing the power, data-transfer, and time-consumption required to make the estimate.

Presently preferred implementations of the disclosure and many of its improvements and advantages have been described with a degree of particularity. The description is of preferred examples of implementing the disclosure, and the description of examples is not necessarily intended to limit the scope of the disclosure. The scope of the disclosure is defined by the following claims.

What is claimed is:

1. An apparatus for facilitating estimation of a time zone at which an electronic device is positioned, the apparatus comprising:

a determiner configured to determine if more than one time-zone-estimative parameter has been received at the electronic device;

an estimator configured to obtain an estimate of the time zone, wherein the estimate of the time zone is obtained based upon at least two time-zone-estimative parameters in response to a determination by the determiner that at least two selected time-zone-estimative parameters have been received at the electronic device and the estimate of the time zone is obtained based upon one time-zone-estimative parameter in response to a determination by the determiner that only a single selected time-zone-estimative parameter has been received at the electronic device; and a verifier configured to verify the estimate obtained by the estimator, wherein the verifier is configured to verify the estimate with a current time indication received from a time server.

2. The apparatus of claim 1 further comprising an identifier configured to identify delivery at the electronic device of all of up to a selected plurality of time-zone-estimative parameters and wherein the determiner is configured to make determination responsive to identification made by the identifier.

3. The apparatus of claim 1 wherein the verifier is further configured to verify the estimate with a mobile country code indication.

4. The apparatus of claim 1 wherein the estimator is further configured to obtain an alternative estimate of the time zone if the estimate first obtained by the estimator fails verification by the verifier.

5. The apparatus of claim 4 wherein the alternative estimate of the time zone obtained by the estimator is based upon a geographic location indication.

6. The apparatus of claim 5 wherein the electronic device comprises a wireless device and wherein the geographic location indication comprises a cell identifier.

7. The apparatus of claim 5 wherein the geographic location indication comprises a GPS, Global Positioning System, identifier.

8. The apparatus of claim 1 wherein the at least two selected time-zone-estimative parameter comprises a mobile country code and a GMT, Greenwich Mean Time, offset.

9. The apparatus of claim 1 wherein the one time-zone-estimative parameter comprises a mobile country code identification.

10. The apparatus of claim 1 wherein the one time-zone-estimative parameter comprises a GMT, Greenwich Mean Time, offset indication.

11. A method for facilitating estimation of a time zone at which an electronic device is positioned, the method comprising:
determining if more than one time-zone-estimative parameter has been received at the electronic device;
in response to a determination that at least two selected time-zone estimative parameters have been received at the electronic device, obtaining an estimate of the time zone based upon at least two time-zone-estimative parameters;
in response to a determination that only a single selected time-zone-estimative parameter has been received at the electronic device, obtaining the estimate of the time zone based upon one time-zone-estimative parameter; and
verifying the estimate obtained with a current time indication received from a time server.

12. The method of claim 11 further comprising:
identifying delivery at the electronic device of all of up to a selected plurality of time-zone-estimative parameters, wherein the determining comprises making a determination responsive to an identification made during the identifying.

13. The method of claim 11 wherein the verifying comprises verifying the estimate with an MCC, mobile country code, indication.

14. The method of claim 11 further comprising:
obtaining an alternative estimate of the time zone if the estimate obtained fails verification during the verifying.

15. The method of claim 14 wherein the obtaining the alternative estimate of the time is based upon a geographic location indication.

16. A method for facilitating time-zone identification at a wireless device, the method comprising:
initiating identification of a time zone at which the wireless device is positioned responsive to a triggering event;
identifying time-zone-estimative parameters received at the wireless device;
in response to a determination that at least two time-zone-estimative parameters have been received, selecting at least two of the time-zone-estimative parameters identified during the identifying to use to estimate the time zone at which the wireless device is positioned,
in response to a determination that only a single time-zone-estimative parameter has been received, selecting the single selected time-zone-estimative parameter identified during the identifying to use to estimate the time zone at which the wireless device is positioned;
obtaining the estimate of the time zone at which the wireless device is positioned with at least a level of verification by verifying the estimate of the time zone with a current time indication received from a time server.

* * * * *